(12) United States Patent
Müller et al.

(10) Patent No.: US 9,534,090 B2
(45) Date of Patent: Jan. 3, 2017

(54) NCO-MODIFIED POLYOXYMETHYLENE BLOCK COPOLYMERS

(71) Applicant: Covestro Deutschland AG, Leverkusen (DE)

(72) Inventors: Thomas Ernst Müller, Aachen (DE); Christoph Gürtler, Köln (DE); Walter Leitner, Aachen (DE); Henning Vogt, Aachen (DE); Gabor Barath, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/654,640

(22) PCT Filed: Dec. 16, 2013

(86) PCT No.: PCT/EP2013/076642
§ 371 (c)(1),
(2) Date: Jun. 22, 2015

(87) PCT Pub. No.: WO2014/095679
PCT Pub. Date: Jun. 26, 2014

(65) Prior Publication Data
US 2015/0322213 A1    Nov. 12, 2015

(30) Foreign Application Priority Data

Dec. 21, 2012 (EP) .................... 12199059

(51) Int. Cl.
*C08G 18/56* (2006.01)
*C08G 81/00* (2006.01)
(Continued)

(52) U.S. Cl.
CPC ............. *C08G 81/00* (2013.01); *C08G 2/30* (2013.01); *C08G 18/56* (2013.01); *C08G 18/71* (2013.01); *C08G 65/002* (2013.01); *C08G 65/331* (2013.01); *C08G 65/33348* (2013.01)

(58) Field of Classification Search
CPC ... C08G 65/33348; C08G 18/56; C08G 18/71; C08G 2/30
See application file for complete search history.

(56) References Cited

U.S. PATENT DOCUMENTS 3,218,295 A   11/1965  Cline
3,575,930 A    4/1971  Dinbergs
(Continued)

FOREIGN PATENT DOCUMENTS

EP    1 418 190 A1   5/2004
GB      807589 A    1/1959
(Continued)

OTHER PUBLICATIONS

International Search Report for PCT/EP2013/076642 mailed Jan. 22, 2014.
(Continued)

*Primary Examiner* — Michael L Leonard
(74) *Attorney, Agent, or Firm* — K&L Gates LLP

(57) ABSTRACT

The invention relates to a method for producing NCO-modified polyoxymethylene block copolymers comprising the step of polymerizing formaldehyde in a reaction vessel in the presence of a catalyst, the polymerization of formaldehyde in addition taking place in the presence of a starter compound comprising at least 2 Zerewitinoff active H atoms to obtain an intermediate product. The intermediate product obtained is reacted further with an isocyanate to obtain an NCO-modified polyoxymethylene block copolymer. The invention also relates to NCO-modified polyoxymethylene block copolymers obtained by a method of this type and to the use of said copolymers for producing polyurethane polymers.

6 Claims, 1 Drawing Sheet

(51) Int. Cl.
- *C08G 18/71* (2006.01)
- *C08G 2/30* (2006.01)
- *C08G 65/333* (2006.01)
- *C08G 65/00* (2006.01)
- *C08G 65/331* (2006.01)

(56) References Cited

U.S. PATENT DOCUMENTS

| | | | |
|---|---|---|---|
| 3,642,942 A * | 2/1972 | Castner et al. | C08G 2/30 524/147 |
| 3,754,053 A | 8/1973 | Kray et al. | |
| 3,979,479 A * | 9/1976 | Radici | C08G 2/38 525/427 |
| 4,352,914 A | 10/1982 | Tobinaga | |
| 4,535,127 A | 8/1985 | Matsuzaki et al. | |
| 5,432,207 A | 7/1995 | Rader | |
| 7,001,959 B2 | 2/2006 | Mück et al. | |
| 2002/0016395 A1 | 2/2002 | Niino et al. | |
| 2015/0322213 A1 | 11/2015 | Muller et al. | |
| 2015/0337070 A1 | 11/2015 | Muller et al. | |
| 2015/0368396 A1 | 12/2015 | Muller et al. | |

FOREIGN PATENT DOCUMENTS

| | | |
|---|---|---|
| GB | 1164997 A | 9/1969 |
| JP | 04306215 A | 10/1992 |
| JP | 2007-211082 A | 8/2007 |
| WO | 9606118 A1 | 2/1996 |

OTHER PUBLICATIONS

Sharma et al., "Copolymerization reactions of carbon dioxide, Preprints of Papers", American Chemical Society. Division of Fuel Chemistry, vol. 45, No. 4 pp. 676-680 (Jan. 1, 2000).

Office Action for U.S. Appl. No. 14/654,665 dated Jan. 15, 2016.

Office Action for U.S. Appl. No. 14/654,665 dated Apr. 14, 2016.

* cited by examiner

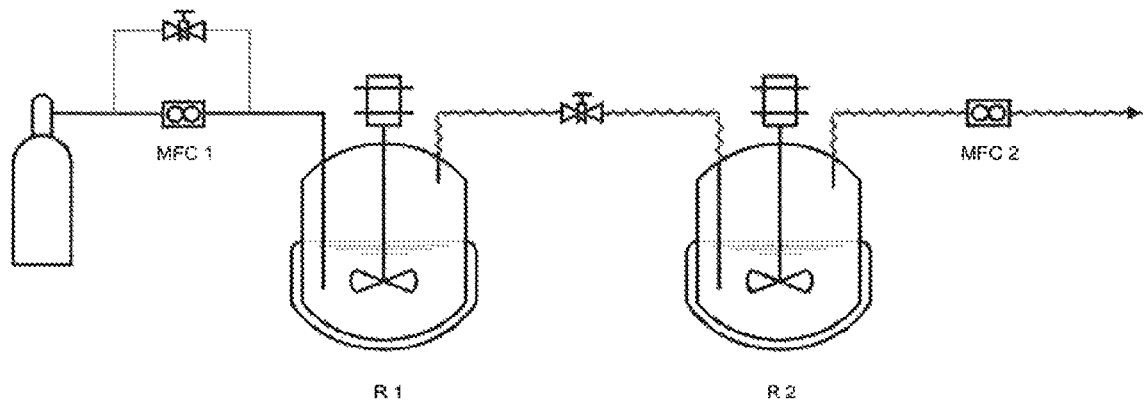

NCO-MODIFIED POLYOXYMETHYLENE BLOCK COPOLYMERS

CROSS-REFERENCE TO RELATED APPLICATIONS

This application is a national stage application (under 35 U.S.C. §371) of PCT/EP2013/076642, filed Dec. 16, 2013, which claims benefit of European Application No. 12199059.2, filed Dec. 21, 2012, both of which are incorporated herein by reference in their entirety.

The present invention relates to a process for preparing NCO-modified polyoxymethylene block copolymers, comprising the step of polymerizing formaldehyde in a reaction vessel in the presence of a catalyst, wherein the polymerization of formaldehyde is additionally effected in the presence of a starter compound having at least 2 Zerewitinoff-active hydrogen atoms to obtain an intermediate, and the latter is reacted with an isocyanate. It further relates to NCO-modified polyoxymethylene block copolymers obtainable by such a process and to the use thereof for preparation of polyurethane polymers.

GB 1164997 describes the joining of polyoxypropylene polyols with formaldehyde to form acetal units and give polyols having a functionality>3. However, the Brønsted-acidic catalysts used are unsuitable for polymerization of formaldehyde and, for reasons including the molar ratios of formaldehyde to polyol described, the products disclosed cannot have a block copolymer structure.

GB 807589 describes block copolymers containing polyoxymethylene units alongside other polymer and polycondensate units. The block copolymers described have a molecular weight of ≥4500 g/mol. However, polymers having a high molecular weight are unsuitable for use as a polyurethane unit.

EP 1 418 190 A1 describes copolymers of polyether diols and formaldehyde having a molecular weight of ≥15 000 g/mol. These polymers are not suitable for use as a polyurethane unit either because of the high molecular weight.

U.S. Pat. No. 3,754,053 describes block copolymers having a molecular weight of ≥10 000 g/mol, containing at least one polyoxymethylene segment and at least two polyoxyalkylene segments. The block copolymers described are fundamentally restricted to a maximum functionality of F≤2. For the polyurethane applications, however, as well as polymers having a functionality of F=2, also of particular interest is the route to polymers having a functionality F>2. Here too, the polymers described are unsuitable for uses as a polyurethane unit because of their high molecular weight.

U.S. Pat. No. 4,352,914 describes specific methylol (=hemiacetal) derivatives of bisphenols and ketones, which are prepared by reaction of said bisphenols or ketones with formaldehyde and are obtained as a mixture with higher molecular weight condensation products of said methylol derivatives. The products thus obtained do not have a block copolymer structure.

US 2002/0016395 and JP 04-306215 describe block copolymers containing polyoxymethylene units and polyolefin units. Here too, the products of the invention have molecular weights of ≥10 000 g/mol and are therefore unsuitable for use as a polyurethane unit.

All the polyoxymethylene-containing block copolymers described have molecular weights≥4500 g/mol and, because of the attendant properties (high viscosity, low mass-based functionality), are unsuitable for use as prepolymers in the polyurethane sector. The mechanical properties of the polyurethanes prepared therefrom are likewise lowered in the case of use of high molecular weight diols and polyols.

U.S. Pat. No. 3,575,930 describes the reaction of dihydroxy-terminated paraformaldehyde $HO(CH_2O)_nH$ having n=2-64 with diisocyanates to give isocyanate-terminated polyoxymethylene polymers, which can be converted to polyurethanes in the reaction with diols. The paraformaldehyde used differs fundamentally from the polyoxymethylene block copolymers of the invention because of the absence of additional oligomeric units and because of its high partial crystallinity, which is manifested in physical properties such as glass transition temperature, melting point and viscosity.

Low molecular weight bifunctional or higher-functionality block copolymers containing polyoxymethylene units alongside other oligomeric structural units are unknown. Moreover, the reaction of block copolymers containing polyoxymethylene units with isocyanates for preparation of polyurethanes is unknown.

The problem addressed was therefore that of providing polyoxymethylene block copolymers for polyurethane applications, which react with isocyanates and can thus be used in the polyurethane sector.

This problem has been solved in accordance with the invention by a process for preparing NCO-modified polyoxymethylene block copolymers, comprising the step of polymerizing formaldehyde in the presence of a catalyst, wherein the polymerization of formaldehyde is additionally effected in the presence of a starter compound having at least 2 Zerewitinoff-active hydrogen atoms, giving an intermediate having a number-average molecular weight of <4500 g/mol, and the resultant intermediate is reacted with an isocyanate to give an NCO-modified polyoxymethylene block copolymer.

It has been found that, surprisingly, the resultant polyoxymethylene block copolymers can be reacted directly after preparation thereof (in situ), or after isolation (ex situ), with isocyanates to give polyurethane-analogous compounds, without any need for the addition of additional catalysts or other additives. The resultant low molecular weight polyoxymethylene block copolymers offer a number of advantages over existing bifunctional or higher-functionality polymers. For instance, it is possible to control particular physical properties such as glass transition temperatures, melting ranges and viscosities via the length of the polyoxymethylene blocks in relation to the additional oligomers.

Compared to polyoxymethylene homopolymers of the same molecular weight, partial crystallinity in the polyoxymethylene block copolymers of the invention is typically lowered, which typically likewise leads to a lowering of glass transition temperatures, melting points and viscosities. The presence of additional oligomer blocks that originate from a starter molecule additionally leads typically to an increase in chemical and thermal stability.

Polyoxymethylene homopolymers are typically restricted to a functionality F≤2. Via the use of starter compounds having a functionality F≥2 (for example ≥3), in contrast, access to polyoxymethylene block copolymers having a functionality F≥2 is possible.

Compared to polyether polyols of the same molecular weight, the proportion of polyoxyalkylene units which are prepared from the corresponding alkylene oxides is reduced by the polyoxymethylene fraction, which leads to an advantageous energy balance in the product. Physical properties such as glass transition temperatures, melting ranges and viscosities, for a given molecular weight, can be controlled via the length of the polyoxymethylene blocks in relation to the polyether blocks.

Polyoxymethylene block copolymers in the context of this invention refer to polymeric compounds which contain at least one polyoxymethylene block and at least one additional oligomeric block and preferably do not exceed a molecular weight in the mid-four digit range.

A polyoxymethylene block in the context of the invention comprises at least one and preferably at most 150 oxymethylene units bonded directly to one another. An additional oligomeric block in the context of the invention differs structurally from a polyoxymethylene block and is formed from monomers other than formaldehyde, although the presence of oxymethylene groups in the additional oligomeric block is not ruled out. The incorporation of the additional oligomeric block in the context of the invention can be effected in a simple manner through the use of oligomeric starter compounds. The oligomeric starter compound is then incorporated into the polyoxymethylene block copolymer of the invention as an additional oligomeric block, or is part of the additional oligomeric block. The oligomeric starter compound, optionally immediately before the formaldehyde polymerization step of the invention, can be formed from the monomers and optionally a starter compound of relatively low molecular weight. The properties of the oligomeric block can be adjusted via the number and type of monomers present.

The intermediate in the sense of the invention is understood to mean the reaction product after the reaction of the starter compound with formaldehyde, which can easily be adjusted through the process of the invention to a number-average molecular weight of <4500 g/mol. Formaldehyde can be used in the gaseous state, optionally as a mixture with inert gases, e.g. nitrogen or argon, and/or with gaseous, supercritical or liquid carbon dioxide, or in the form of a formaldehyde solution. Formaldehyde solutions may be aqueous formaldehyde solutions having a formaldehyde content between 1% and 37% by weight, which may optionally contain up to 15% by weight of methanol as stabilizer. Alternatively, it is possible to use solutions of formaldehyde in polar organic solvents, for example methanol or higher mono- or polyhydric alcohols, 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another, or with water and/or other solvents. The presence of further substances in solution is likewise included as well. Preference is given to the use of gaseous formaldehyde. Particular preference is given to use of mixtures of gaseous formaldehyde with argon and/or carbon dioxide. Likewise preferred is the use of solutions of formaldehyde in aprotic polar organic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or other solvents.

Alternatively, formaldehyde can be generated in situ from a suitable formaldehyde source. Formaldehyde sources used may be substances which contain chemically bound formaldehyde, typically in the form of oxymethylene groups, and are capable of releasing formaldehyde under suitable conditions. Suitable conditions for the release may include, for example, elevated temperatures and/or the use of catalysts and/or the presence of acids, bases or other reagents which lead to the release of monomeric formaldehyde. Preferred formaldehyde sources are 1,3,5-trioxane, paraformaldehyde, polyoxymethylene, dimethyl acetal, 1,3-dioxolane, 1,3-dioxane and/or 1,3-dioxepane, particular preference being given to 1,3,5-trioxane and paraformaldehyde.

The starter compounds in the context of the invention are bifunctional or higher-functionality compounds having a number-average molecular weight $M_n$ of, for example, between 100 and 3000 g/mol. The functionality is established via deprotonatable functional groups which contain heteroatoms and are terminal or arranged along the polymer chain, for example hydroxyl groups, thiol groups, amino groups, carboxylic acid groups or carboxylic acid derivatives, for example amides. Hydrogen bonded to N, O or S is referred to as a Zerevitinov-active hydrogen (or as "active hydrogen") when it gives methane by reaction with methylmagnesium iodide by a process discovered by Zerevitinoff. The starter compounds typically have a functionality of $\geq 2$, for example within a range from $\geq 2$ to $\leq 6$, preferably from $\geq 2$ to $\leq 4$ and more preferably from $\geq 2$ to $\leq 3$.

Solvents used may, for example, be water, methanol or higher mono- or polyhydric alcohols, nonpolar organic solvents, for example linear or branched alkanes or alkane mixtures, toluene, the various xylene isomers or mixtures thereof, mesitylene, mono- or polyhalogenated aromatics or alkanes, open-chain or cyclic ethers, for example tetrahydrofuran (THF) or methyl tert-butyl ether (MTBE), open-chain or cyclic esters, or polar aprotic solvents, for example 1,4-dioxane, acetonitrile, N,N-dimethylformamide (DMF), N,N-dimethylacetamide, dimethyl sulfoxide (DMSO), cyclic carbonates, for example ethylene carbonate or propylene carbonate, N-methylpyrrolidone (NMP), sulfolane, tetramethylurea, N,N'-dimethylethyleneurea or mixtures thereof with one another, with water and/or with other solvents. It is also possible to use liquid or supercritical carbon dioxide as solvent in neat form or as a mixture with one of the abovementioned solvents. Preference is given to open-chain or cyclic ethers, for example tetrahydrofuran (THF) or methyl tert-butyl ether (MTBE), open-chain or cyclic esters, polar aprotic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or other solvents, and liquid or supercritical carbon dioxide. Particular preference is given to reaction in the absence of solvents; especially preferred is the reaction in the absence of water as solvent and/or aqueous reagents.

The reaction can be conducted in a batchwise process, in a semi-batchwise process or in a continuous process. In the preferred semi-batchwise process, a mixture of starter, catalyst and optionally a solvent is initially charged, and formaldehyde or the formaldehyde source in neat form as a gas or liquid or in solution is metered into the reaction. The amount of formaldehyde or of formaldehyde equivalents present in the formaldehyde source which is metered in is chosen so as to attain the desired molecular weight of the intermediate.

The reaction is conducted, for example, at a temperature between 20 and 200° C., preferably between 20 and 120° C. and more preferably between 40 and 120° C. In the case of use of a formaldehyde source containing chemically bound formaldehyde, the reaction temperature is above the temperature required for release of formaldehyde under the given conditions. In the presence of suitable catalysts which accelerate the release of formaldehyde, the reaction temperature may be below the temperature needed for the uncatalyzed release of formaldehyde. In some cases, the catalysts for the preparation of the polyoxymethylene block copolymers of the invention may likewise function as catalysts for the release of formaldehyde.

The pressure during the polymerization of formaldehyde in the presence of the starter compound and optionally additional comonomer is 1 to 200 bar. In the case of use of gaseous formaldehyde, the pressure is preferably 5 to 100 bar, more preferably 10 to 50 bar.

The reaction time for the polymerization is, for example, 0.05 to 120 hours, preferably 0.5 to 48 hours, more preferably 1 to 24 hours. The reaction time is considered to be the period of time during which catalyst, formaldehyde and starter compound are in direct contact at reaction temperature. Especially in the case of performance in a semi-batchwise process, for example in the case of introduction of gaseous formaldehyde into the reaction mixture, the reaction time is guided by the amount of formaldehyde metered in or of formaldehyde equivalents metered in.

The product mixture obtained in the preparation of the polyoxymethylene block copolymers can be used without further purification steps in the reaction with isocyanates to give polyurethanes. The further reaction can be effected directly in the present reactor (in situ) or in a second reactor without prior isolation of the polyoxymethylene block copolymers. Alternatively, the reaction mixture can be used for the further reaction with a time delay, for example after transfer or storage. For the further reaction, preference is given to using product mixtures in which the polyoxymethylene block copolymers have been obtained in the absence of solvents.

If aqueous solutions are used in the process of the invention, it is preferable when the water of solution is removed in a step preceding the isocyanate reaction, preferably by a stripping step. Preferably, however, the process of the invention is conducted in the absence of aqueous reagents, such that no additional step for removal of the water of solution is required.

In the case of preparation of the low molecular weight polyoxymethylene block copolymers of the invention in the presence of solvents, the further reaction may be preceded by removal of the volatile components, for example by vacuum distillation or thin-film evaporation. Additional purification steps, for example extraction, precipitation and/or filtration, for example for removal of the catalyst, are likewise included.

Embodiments of the process of the invention are described hereinafter. They can be combined with one another as desired, unless the opposite is clear from the context.

The resultant intermediate (polyoxymethylene block copolymer) has a number-average molecular weight $M_n$ of <4500 g/mol, preferably ≤3500 g/mol, and more preferably ≤3000 g/mol. The molecular weight can be determined by means of gel permeation chromatography against polypropylene glycol standards or via the OH number. Preferably, the number-average molecular weight $M_n$ of the intermediate is ≥92 g/mol to <4500 g/mol, especially preferably ≥500 g/mol to <4500 g/mol, more preferably ≥600 g/mol to ≤3500 g/mol and very especially preferably ≥600 g/mol to ≤3000 g/mol.

The molecular weight is appropriately adjusted to a value of <4500 g/mol via the stoichiometry of the feedstocks. Thus, the sum total of the molar amounts $n_i$ of all the monomers i introduced into the polyoxymethylene block copolymer of the invention, i.e. the sum total of the molar amount $n_{FA}$ of formaldehyde or of the formaldehyde equivalents present in the formaldehyde source and the molar amounts of the additional comonomers, is chosen such that $$M_{Starter} + \frac{\sum_i n_i \times M_i}{n_{Starter}} < 4500 \text{ g/mol} \quad \text{(equation I)}$$

where $n_{Starter}$ is the molar amount and $M_{Starter}$ the number-average molecular weight of the starter compound, and $M_i$ is the molecular weight of the respective monomer i.

In a further embodiment of the method according to the invention, the catalyst is selected from the group of the basic catalysts and/or the Lewis-acidic catalysts. Catalysts used are compounds which catalyze the polymerization of formaldehyde. These may be basic catalysts or Lewis-acidic catalysts containing, as the Lewis-acidic center, for example, a metal of the third, fourth or fifth main group, especially boron, aluminum, tin or bismuth, a metal of the third or fourth transition group or of the lanthanoid series, vanadium, molybdenum, tungsten or a metal of the eighth to tenth transition groups. Preference is given to Lewis-acidic catalysts.

Examples of basic catalysts are tertiary or aromatic basic amines, for example triethylamine and other trialkylamines, pyridine and mono- or polysubstituted pyridine derivatives, N-alkyl- or N-arylimidazole, 1,4-diazabicyclo[2.2.2]octane (DABCO), 4-(dimethylamino)pyridine (DMAP), 1,8-diazabicyclo[5.4.0]undec-7-ene (DBU), triazabicyclo[4.4.0]dec-5-ene (TBD) and 7-methyl-1,5,7-triazabicyclo[4.4.0]dec-5-ene (MTBD). Further examples of basic catalysts are inorganic basic compounds, for example alkali metal hydroxides, especially potassium hydroxide and cesium hydroxide. The addition of further additives for increasing solubility and/or reactivity, for example crown ethers or tetraalkylammonium, tetraalkylphosphonium or tetraarylphosphonium salts, is not ruled out.

Lewis-acidic catalysts contain, as the Lewis-acidic center, one or more coordinatively unsaturated metal atoms, for example metals of the third, fourth or fifth main group, especially boron, aluminum, tin or bismuth, metals of the third and fourth transition group and metals of the lanthanoid series, vanadium, molybdenum, tungsten, metals of the eighth to tenth transition groups, especially iron, cobalt, nickel, rhodium, iridium, palladium, platinum, copper or zinc. It is a feature of the coordinatively unsaturated Lewis-acidic center that nucleophilic molecules can bind thereto. The coordinatively unsaturated Lewis-acidic center may already be present in the compound used as catalyst or forms in the reaction mixture, for example as a result of elimination of a weakly bound nucleophilic molecule. Particular preference is given to Lewis-acidic catalysts containing, as the Lewis-acidic center, one or more tin, bismuth, vanadium or molybdenum atoms, for example dibutyltin dilaurate (DBTL), dibutyltin oxide, bismuth tris(2-ethylhexanoate), lithium orthovanadate or lithium molybdate.

The catalyst is typically used in a molar ratio of 1:10 000 to 10:1, preferably 1:1000 to 1:1, more preferably 1:1000 to 1:10, relative to the functional groups present in the starter compound.

In a further embodiment of the process of the invention, the reaction of the intermediate with the isocyanate is conducted in the presence of a catalyst which is the same catalyst as in the preceding polymerization of formaldehyde.

Such an embodiment also has the advantage that the catalyst which is used for polymerization of formaldehyde need not be removed prior to the reaction with the isocyanate, such that the process of the invention can also be conducted as a "one-pot" process.

In a further embodiment of the process of the invention, the starter molecule has a number-average molecular weight $M_n$ of ≥62 g/mol to ≤4470 g/mol, preferably of ≥90 g/mol to 3470 g/mol, more preferably of ≥100 g/mol to ≤3000 g/mol and most preferably of ≥350 g/mol to ≤3000 g/mol.

In a further embodiment, the starter molecule is an oligomeric starter compound having at least two Zerewitinoff-active hydrogen atoms and a number-average molecular weight $M_n$ of ≥100 g/mol to ≤4470 g/mol, preferably of ≥210 g/mol to 3470 g/mol and more preferably of ≥350 g/mol to ≤3000 g/mol. The number-average molecular weight $M_n$ of the starter molecule can be determined in the same way as the number-average molecular weight $M_n$ of the intermediate of the invention, by means of gel permeation chromatography or via the OH number.

In a further embodiment of the process of the invention, the starter molecule is selected from the group of the polyether polyols, polyester polyols, polyether ester polyols, polycarbonate polyols and/or polyacrylate polyols. The polyols may have, for example, a number-average molecular weight $M_n$ of ≥62 g/mol to ≤8000 g/mol, preferably of ≥90 g/mol to ≤5000 g/mol and more preferably of ≥92 g/mol to ≤2000 g/mol.

The average OH functionality of the polyols is ≥2, for example within a range from ≥2 to ≤6, preferably from ≥2.0 to ≤4 and more preferably from ≥2.0 to ≤3.

Usable polyether polyols are, for example, polytetramethylene glycol polyethers, as obtainable by polymerization of tetrahydrofuran by means of cationic ring opening.

Likewise suitable polyether polyols are addition products of styrene oxide, ethylene oxide, propylene oxide, butylene oxide and/or epichlorohydrin onto di- or polyfunctional starter molecules.

Suitable starter molecules for the polyether polyols are, for example, water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, butane-1,4-diol, hexane-1,6-diol and low molecular weight hydroxyl-containing esters of such polyols with dicarboxylic acids.

Suitable polyester polyols include polycondensates of di- and additionally tri- and tetraols and di- and additionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols for preparation of the polyesters.

Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate.

Polycarboxylic acids used may, for example, be phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. The acid sources used may also be the corresponding anhydrides.

If the mean functionality of the polyol to be esterified is >2, it is additionally also possible to use monocarboxylic acids, for example benzoic acid and hexanecarboxylic acid as well.

Hydroxycarboxylic acids which can additionally be used as reaction participants in the preparation of a polyester polyol having terminal hydroxyl groups are, for example, hydroxycaproic acid, hydroxybutyric acid, hydroxydecanoic acid, hydroxystearic acid and the like. Suitable lactones include caprolactone, butyrolactone and homologs.

Usable polycarbonate polyols are polycarbonates having hydroxyl groups, for example polycarbonate diols. These are obtainable by reaction of carbonic acid derivatives, such as diphenyl carbonate, dimethyl carbonate or phosgene, with polyols, preferably diols.

Examples of such diols are ethylene glycol, propane-1,2- and 1,3-diol, butane-1,3- and -1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, and lactone-modified diols of the aforementioned type.

Usable polyether ester polyols are those compounds which contain ether groups, ester groups and OH groups. Organic dicarboxylic acids having up to 12 carbon atoms are suitable for preparation of the polyether ester polyols, preferably aliphatic dicarboxylic acids having ≥4 to ≤6 carbon atoms or aromatic dicarboxylic acids, which are used individually or in a mixture. Examples include suberic acid, azelaic acid, decanedicarboxylic acid, maleic acid, malonic acid, phthalic acid, pimelic acid and sebacic acid, and especially glutaric acid, fumaric acid, succinic acid, adipic acid, phthalic acid, terephthalic acid and isophthalic acid. Derivatives of these acids used may, for example, be the anhydrides thereof and the esters and monoesters thereof with low molecular weight monofunctional alcohols having ≥1 to ≤4 carbon atoms.

A further component used for preparation of the polyether ester polyols is polyether polyols, which are obtained by alkoxylating starter molecules, for example polyhydric alcohols. The starter molecules are at least difunctional, but may optionally also contain proportions of higher-functionality, especially trifunctional, starter molecules.

Starter molecules for these polyether polyols are, for example, diols having number-average molecular weights $M_n$ of preferably ≥18 g/mol to ≤400 g/mol or of ≥62 g/mol to ≤200 g/mol, such as ethane-1,2-diol, propane-1,3-diol, propane-1,2-diol, butane-1,4-diol, pentene-1,5-diol, pentane-1,5-diol, neopentyl glycol, hexane-1,6-diol, heptane-1,7-diol, octane-1,8-diol, decane-1,10-diol, 2-methylpropane-1,3-diol, 2,2-dimethylpropane-1,3-diol, 3-methylpentane-1,5-diol, 2-butyl-2-ethylpropane-1,3-diol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, such as diethylene glycol.

As well as the diols, it is also possible to use polyols having number-average functionalities of >2 to ≤8 or of ≥3 to ≤4 as well, for example 1,1,1-trimethylolpropane, triethanolamine, glycerol, sorbitan and pentaerythritol, and also polyethylene oxide polyols started from triols or tetraols and having mean molecular weights of preferably ≥62 g/mol to ≤400 g/mol or of ≥92 g/mol to ≤200 g/mol.

Polyether ester polyols can also be prepared by the alkoxylation of reaction products which are obtained by the reaction of organic dicarboxylic acids and diols. Derivatives of these acids used may, for example, be the anhydrides thereof, for example phthalic anhydride.

Polyacrylate polyols can be obtained by free-radical polymerization of olefinically unsaturated monomers having hydroxyl groups or by free-radical copolymerization of olefinically unsaturated monomers having hydroxyl groups with optionally other olefinically unsaturated monomers. Examples thereof are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable olefinically unsaturated monomers having hydroxyl groups are especially 2-hydroxyethyl acrylate, 2-hydroxyethyl methacrylate, the hydroxylpropyl acrylate isomer mixture obtainable by addition of propylene oxide onto acrylic acid, and the hydroxypropyl methacrylate isomer mixture obtainable by addition of propylene oxide onto methacrylic acid. Terminal hydroxyl groups may also be in protected form. Suitable free-radical initiators are those from the group of the azo compounds, for example azoisobutyronitrile (AIBN), or from the group of the peroxides, for example di-tert-butyl peroxide. In a further embodiment of the process of the invention, the isocyanate is an aliphatic or aromatic di- or polyisocyanate. Examples are butylene 1,4-diisocyanate, pentane 1,5-diisocyanate, hexamethylene 1,6-diisocyanate (HDI) or the dimers, trimers, pentamers, heptamers or nonamers thereof or mixtures thereof, isophorone diisocyanate (IPDI), 2,2,4- and/or 2,4,4-trimethylhexamethylene diisocyanate, the isomeric bis(4,4'-isocyanatocyclohexyl) methanes or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) having $C_1$ to $C_6$-alkyl groups. Preference is given here to an isocyanate from the diphenylmethane diisocyanate series.

As well as the aforementioned polyisocyanates, it is also possible to additionally use proportions of modified diisocyanates having uretdione, isocyanurate, urethane, carbodiimide, uretonimine, allophanate, biuret, amide, iminooxadiazinedione and/or oxadiazinetrione structure, and also of unmodified polyisocyanate having more than 2 NCO groups per molecule, for example 4-isocyanatomethyl-1,8-octane diisocyanate (nonane triisocyanate) or triphenylmethane 4,4',4''-triisocyanate.

It is possible that the diisocyanate is a prepolymer obtainable by reaction of an isocyanate having an NCO functionality of ≥2 and polyols having a molecular weight of ≥62 g/mol to ≤8000 g/mol and OH functionalities of ≥1.5 to ≤6.

In a further embodiment of the process of the invention, the formaldehyde is introduced into the reaction vessel in the form of gaseous formaldehyde. It has been found that, surprisingly, when gaseous formaldehyde is used, NCO-modified polyoxymethylene block copolymers having a particularly low content of by-products are obtained. In the process of the invention, the polyoxymethylene units are joined to the additional oligomers either directly or indirectly via one or more further comonomers or spacers. The intermediate preferably contains, as outer (=terminal) blocks, polyoxymethylene blocks, such that the polyoxymethylene units can be joined to the isocyanate component in the subsequent reaction of the intermediate with the isocyanate component. It is also possible for a plurality of polyoxymethylene units to be joined to one another via one or more further comonomers. Therefore, in a further embodiment of the process of the invention, the polymerization is additionally effected in the presence of a further comonomer. Further comonomers used may, for example, be cyclic ethers, especially epoxides, for example ethylene oxide, propylene oxide or styrene oxide, oxetane, THF, dioxane, cyclic acetals, for example 1,3-dioxolane or 1,3-dioxepane, cyclic esters, for example γ-butyrolactone, γ-valerolactone, ε-caprolactone, or cyclic acid anhydrides, for example maleic anhydride, glutaric anhydride or phthalic anhydride. Preferred further comonomers are epoxides, cyclic acetals and cyclic esters; particularly preferred further comonomers are ethylene oxide, propylene oxide, 1,3-dioxolane, 1,3-dioxepane and ε-caprolactone.

The metered addition of further comonomers can be effected in neat form or in solution. In an alternative embodiment, the metered addition of further comonomers is effected in a mixture with formaldehyde or the formaldehyde source. The metered addition of further comonomers can be effected prior to the metered addition, parallel to the metered addition or after the metered addition of formaldehyde or the formaldehyde source.

The present invention further provides NCO-modified polyoxymethylene block copolymers obtainable by a process of the invention.

In one embodiment, the NCO-modified polyoxymethylene block copolymers have a number-average molecular weight of ≤15 000 g/mol, preferably ≤8000 g/mol, more preferably ≤5000 g/mol. The number-average molecular weight can be determined, for example, by GPC against polypropylene glycol standards.

In a further embodiment, the NCO-modified polyoxymethylene block copolymers have a viscosity at 20° C. of ≤100 000 mPa·s, preferably ≤50 000 mPa·s, more preferably ≤15 000 mPa·s.

The NCO-modified polyoxymethylene block copolymers obtainable by the process of the invention have a low content of by-products and can be processed without any problem, especially by reaction with chain extenders to give polyurethanes. For polyurethane applications, preference is given to using NCO-modified polyoxymethylene block copolymers having a functionality of at least 2. In addition, the NCO-modified polyoxymethylene block copolymers obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations.

The invention therefore likewise relates to the use of NCO-modified polyoxymethylene block copolymers of the invention for preparation of polyurethane polymers.

In one embodiment of the use, the polyurethane polymers are flexible polyurethane foams.

In a further embodiment of the use, the polyurethane polymers are thermoplastic polyurethane polymers.

EXAMPLES

The invention is illustrated in more detail by the figures and examples which follow, but without being restricted thereto. The figures show:

FIG. 1 a reactor arrangement for performance of the process of the invention

H-functional oligomeric compounds used:

PET-1 difunctional poly(oxypropylene)polyol having an OH number of 109.6 mg$_{KOH}$/g, giving the mean molecular weight M.W.=1022 g/mol and the average empirical formula HO(CH(CH$_3$)CH$_2$)$_{17.02}$H. By GPC against polypropylene glycol standards, a number-average molecular weight M$_n$=1011 g/mol and a polydispersity index PDI=1.07 were measured.

PET-2 trifunctional poly(oxypropylene)polyol (CAS No. [25791-96-2]) having an OH number of 225.5 mg$_{KOH}$/g, giving the mean molecular weight M.W.=745 g/mol and the average empirical formula (C$_3$H$_5$O$_3$)((CH(CH$_3$)CH$_2$O)$_{11.26}$ H$_3$. By GPC against polypropylene glycol standards, a number-average molecular weight M$_n$=639 g/mol and a polydispersity index PDI=1.06 were measured.

The formaldehyde source used was paraformaldehyde (CAS [30525-89-4]) from Aldrich (catalog number 16005, Lot#SZBB0250V).

Description of the methods:

The molar mass distributions were determined by means of gel permeation chromatography (GPC).

Gel permeation chromatography (GPC): The measurements were effected on the Agilent 1200 Series instrument (G1310A Iso Pump, G1329A ALS, G1316A TCC, G1362A RID, G1365D MWD), detection via RID; eluent: chloroform (GPC grade), flow rate 1.0 ml/min; column combination: PSS SDV precolumn 8×50 mm (5 µm), 2×PSS SDV linear S 8×300 mL (5 µm). Polypropylene glycol samples of known molar mass from PSS Polymer Standards Service were used for calibration. The measurement recording and evaluation software used was the software package "PSS WinGPC Unity". The GPC chromatograms were recorded in accordance with DIN 55672-1, except using chloroform as eluent rather than THF.

$^1$H NMR spectroscopy: The measurements were effected on the Bruker AV400 instrument (400 MHz); the chemical shifts were calibrated relative to the solvent signal (CDCl$_3$, δ=7.26 ppm); s=singlet, m=multiplet, bs=broadened singlet, kb=complex region. The reaction of the terminal hydroxyl groups with 4-tolyl isocyanate was determined via the comparison of the integrals for the methyl groups for Tol-CH$_3$ (2.09-2.25 ppm) and PET-1-CH$_3$ or PET-2-CH$_3$ (1.13-1.26 ppm).

$^{13}$C NMR spectroscopy: The measurements were effected on the Bruker AV400 instrument (100 MHz); the chemical shifts were calibrated relative to the solvent signal (CDCl$_3$, δ=77.16 ppm); APT (attached proton test): CH$_2$, C$_{quart}$: positive signal (+); CH, CH$_3$: negative signal (−); HMBC: Hetero multiple bond correlation; HSQC: Heteronuclear single-quantum correlation.

Infrared (IR) spectroscopy: The measurements were effected on the Bruker Alpha-P FT-IR spectrometer, the measurements were effected neat; signal intensities: vs=very strong (90-100/absorbance), s=strong (70-90% absorbance), m=medium (30-70% absorbance), w=weak (10-30% absorbance), vw=very weak (0-10% absorbance, in each case relative to the most intense signal); b=broadened band.

Electrospray mass spectrometry (ESI-MS): The measurements were effected on the Thermo Fisher Scientific LTQ Orbitrap XL instrument; samples were diluted with MeOH.

The OH number (hydroxyl number) was determined on the basis of DIN 53240-2, except using N-methylpyrrolidone rather than THF/dichloromethane as the solvent. A 0.5 molar ethanolic KOH solution was used for titration (end-point recognition by means of potentiometry). The test substance used was castor oil with certified OH number. The reporting of the unit in "mg$_{KOH}$/g" relates to mg[KOH]/g [polyol]. The OH number is related to the equivalent molar mass according to the following equation:

OH number [mg$_{KOH}$/g]=56100 [mg$_{KOH}$/mol]/equivalent molar mass [g/mol]

The equivalent molar mass is understood to mean the number-average total molar mass of the material containing active hydrogen atoms divided by the number of active hydrogen atoms (functionality).

The viscosity was determined on an Anton Paar Physica MCR 501 rheometer. A cone-plate configuration having a separation of 50 µm was selected (DCP25 measurement system). 0.1 g of the substance was applied to the rheometer plate and subjected to a shear of 0.01 to 1000 l/s at 25° C., and the viscosity was measured every 10 s for 10 min. The viscosity averaged over all the measurement points is reported.

For the reactions, an experimental apparatus consisting of two 200 mL stainless steel autoclaves which were connected via a heatable ⅛ inch glass capillary ("bridge") which could be shut off with a valve was used. Both reactors were equipped with a hollow shaft stirrer and manometer and were heatable independently of one another. The gas supply to reactor 1 ("depolymerization reactor" R1) was via an immersed tube connected to a mass flow regulator (MFC 1, capacity: 100 mL/min). The gas stream was passed through the bridge from reactor 1 into reactor 2. In reactor 2 ("polymerization reactor" R2) there was a gas outlet, and the offgas flow was controlled with the aid of a second mass flow regulator (MFC 2, capacity: 100 mL/min). Via MFC 1, a carrier gas stream (argon or carbon dioxide) was passed through reactor 1 with the volume flow rate $\hat{V}_{in}$, and the depolymerization of paraformaldehyde to gaseous formaldehyde was conducted therein. The carrier gas stream enriched with formaldehyde gas was then passed through the heated bridge into reactor 2, in which the polymerization was conducted. By closed-loop control of MFC 2 to give a volume flow rate $\hat{V}_{out}=\hat{V}_{in}$, constant pressure in the overall system was assured.

The pressure reactors used in the examples had a height (internal) of 6.84 cm and an internal diameter of 5.98 cm. The reactors were equipped with an electrical heating jacket (maximum heating power 240 watts). In addition, the reactors were equipped with an inlet tube, and each was equipped with a thermal sensor of diameter 1.6 mm which projected into the reactor up to 3 mm above the base.

The hollow shaft stirrer used in the examples was a hollow shaft stirrer in which the gas was introduced into the reaction mixture via a hollow shaft in the stirrer. The stirrer body mounted on the hollow shaft had four arms and had a diameter of 25 mm and a height of 7 mm. At each end of the arm was mounted a gas outlet which had a diameter of 3 mm. The rotation of the stirrer gave rise to a reduced pressure such that the gas present above the reaction mixture (CO$_2$ and possibly formaldehyde) was sucked in and introduced through the hollow shaft of the stirrer into the reaction mixture.

Example 1

Preparation of a Bifunctional Polypropylene Oxide-Polyoxymethylene Block Copolymer and In Situ Modification with 4-Tolyl Isocyanate Reactor 1 was initially charged with a suspension of 30.34 g (1.01 mol) of paraformaldehyde, 0.67 g (2.05 mmol) of 4-dodecylbenzenesulfonic acid and 8.15 g of anhydrous 3 Å molecular sieve in 30 ml of undecane. Reactor 2 contained a solution of 70.0 mg (0.111 mmol) of dibutyltin dilaurate (DBTL) in 20.02 g (20.02 mmol) of PET-1. Via a bypass line connected to MFC 1, the whole system with the bridge open was pressurized to 20 bar with $CO_2$. Then the bridge was closed and the pressure in reactor 1 was reduced to 5 bar by means of a gas outlet valve. The reaction mixture in reactor 1 was heated to 125° C. while stirring with the bridge shut off, and the reaction mixture in reactor 2 to 60° C. while stirring. The bridge temperature was adjusted to 170° C. On attainment of the reaction temperature, the pressure in reactor 2 was adjusted to a value between 17 and 19 bar. The pressure in reactor 1 was adjusted to 20 bar with $CO_2$ via the bypass. The bypass line was closed and a constant argon flow rate $\hat{V}_{out}=\hat{V}_{in}=47.6$ ml/min was established using the mass flow regulators. Directly thereafter, the bridge was opened. After 4.7 h, the bridge was closed, the system was cooled to room temperature and the pressure was released separately in reactor 1 and reactor 2. Subsequently, 5.05 mL (5.33 g, 40.0 mmol) of 4-tolyl isocyanate were introduced into reactor 2 at a flow rate of 1 mL/min while stirring at an internal temperature of 40° C. After the addition had ended, the reaction mixture in reactor 2 was stirred at 60° C. for a further 16 h. Weighing of reactor 2 before the removal of the product showed an increase in weight of 2.40 g (difference in mass minus the mass of the isocyanate fed in) for the reaction, which corresponds to a transfer of 2.40 g (79.9 mmol) of gaseous formaldehyde. 25.11 g of a viscous, colorless oil were removed from reactor 2.

Viscosity: 1.744 Pa·s

As a result of the transfer of 2.40 g (79.9 mmol) of formaldehyde, the PET-1 used as oligomer was extended by an average of 3.95 formaldehyde units per molecule, or 1.98 formaldehyde units per chain end.

By means of gel permeation chromatography (GPC) against polypropylene glycol standards, a number-average molecular weight $M_n$=1172 g/mol and a polydispersity index PDI=1.05 were determined.

$^1$H NMR spectroscopy (400 MHz, $CDCl_3$): δ=0.74-0.84 (m, 0.54; H), 0.88 (bs, 0.16; H), 0.91-1.13 (m, 25.64; H, PET-1-$CH_3$), 1.13-1.26 (m, 2.71; H, PET-1-$CH_3$), 2.09-2.25 (m, 3.00; H, Tol-$CH_3$), 3.14-3.90 (m, 26.69; H, PET-1-CH/PET-1-$CH_2$), 4.61-5.04 (kb, 1.73; H, $OCH_2O$/PET-1-C$\underline{H}$($CH_3$)$OCH_2O$/PET-1-$C\underline{H}_2OCH_2O$), 5.23-5.38 (m, 0.98H, $OCH_2O$), 6.92-7.02 (m, 1.79H, Tol-$CH_{ar}$), 7.14-7.32 (m, 1.75H, Tol-$CH_{ar}$) ppm.

$^{13}$C APT NMR spectroscopy (100 MHz, $CDCl_3$): δ=14.0 (−), 16.8 (−), 17.0 (−), 17.2 (−), 17.3 (−), 17.5 (−), 17.6 (−), 17.9 (−), 18.1 (−), 18.4 (−), 20.4 (−, Tol-$CH_3$), 20.6 (−, Tol-$CH_3$), 22.5 (+), 29.2 (+), 29.5 (+), 29.5 (+), 31.8 (+), 65.4 (−), 67.0 (−), 67.1 (−), 69.3 (+), 69.7 (+), 71.6 (+), 72.7 (+), 73.2 (+), 73.7 (+), 74.3 (+), 74.4 (+), 74.5 (−), 74.8 (−), 74.9 (−), 75.0 (−), 75.2 (−), 75.3 (−), 75.4 (+), 75.7 (+), 75.8 (+), 75.8 (+), 76.5 (−), 82.6 (+, O—$CH_2$—O), 82.7 (+, O—$CH_2$—O), 85.2 (+, O—$CH_2$—O), 85.8 (+, O—$CH_2$—O), 88.3 (+, O—$CH_2$—O), 88.5 (+, O—$CH_2$—O), 88.9 (+, O—$CH_2$—O), 89.8 (+, O—$CH_2$—O), 90.2 (+, O—$CH_2$—O), 90.4 (+, O—$CH_2$—O), 90.7 (+, O—$CH_2$—O), 92.0 (+, O—$CH_2$—O), 92.1 (+, O—$CH_2$—O), 93.8 (+, O—$CH_2$—O), 94.9 (+, O—$CH_2$—O), 117.8 (−, Tol-$CH_{ar}$), 118.8 (−, Tol-$CH_{ar}$), 120.8 (−, Tol-$CH_{ar}$), 129.2 (−, Tol-$CH_{ar}$), 129.4 (−, Tol-$CH_{ar}$), 129.5 (−, Tol-$CH_{ar}$), 130.1 (+), 130.7 (+), 131.5 (+), 132.3 (+), 135.2 (+, Tol-C—NH—), 135.4 (+, Tol-C—NH—), 135.6 (+, Tol-C—NH—), 136.7 (+, Tol-C$\underline{C}CH_3$), 145.8 (+, Tol-NH—C(O)—O), 146.2 (+, Tol-NH—C(O)—O), 152.5-153.4 (+, Tol-NH—C(O)—O) ppm.

The occurrence of a multitude of signals in the $^1$H NMR spectrum in the range of 4.6 to 5.4 ppm, and a multitude of signals having positive polarity in the $^{13}$C APT NMR spectrum in the range of 82.6 to 94.9 ppm, shows the presence of chemically nonequivalent oxymethylene groups in $(CH_2O)_n$ blocks having different chain lengths.

In addition, the presence of the corresponding signals attributed to the carbamate in the $^1$H and $^{13}$C APT NMR spectrum shows that the reaction of the polyoxymethylene block copolymers with 4-tolyl isocyanate was successful. The comparison of the integrals for the methyl groups Tol-$CH_3$ and PET-1-$CH_3$ gives a ratio of 0.106 Tol-$CH_3$ to 1 PET-1-$CH_3$. For an average chain length of 17.02 ($CH(CH_3)$ $CH_2O$)— units per molecule, this gives an average of 1.804 4-tolyl carbamate units per molecule. The reaction of the polyoxymethylene block copolymer with 4-tolyl isocyanate accordingly proceeded with a conversion of 90%.

The HMBC NMR spectrum showed long-range coupling of a PET-1 $^{13}$C signal at 72.7 ppm to $^1$H signals at 4.83 and 4.88 ppm, which, according to HSQC NMR spectroscopy, exhibited direct coupling to $^{13}$C signals at about 88.9 and 90.4 ppm respectively. Both signals in the $^{13}$C APT NMR have positive polarity and can be attributed to oxymethylene groups. This showed that the polypropylene oxide block is bonded covalently to the polyoxymethylene block.

Additionally observed in the HMBC NMR spectrum was long-range coupling of the carbamate $^{13}$C signal at about 153 ppm to $^1$H signals at about 5.34 ppm; according to HSQC NMR spectroscopy, the latter structural unit is coupled directly to $^{13}$C signals at 85.8 and 88.9 ppm. Both signals in the $^{13}$C APT NMR have positive polarity and can be attributed to oxymethylene groups. Analogously, for the carbamate $^{13}$C signal at 146.2 ppm, long-range coupling to $CH_2$ groups at 5.05 ($^1$H) and 82.7 ($^{13}$C) ppm, and also 4.83 ($^1$H) and 88.9 ($^{13}$C) ppm, was observed. This showed that the tolyl carbamate groups are bonded covalently to oxymethylene groups.

These long-range couplings of PET-1 end groups on the one hand and chemically nonequivalent carbamate groups on the other hand to chemically nonequivalent oxymethylene units demonstrate clearly that polyoxymethylene blocks $(CH_2O)^n$ having different chain length n are present, which are bonded covalently both to PET-1 and to carbamate units which originate from the reaction with 4-tolyl isocyanate. The structure of the polyoxymethylene block copolymers of the invention has thus been demonstrated beyond doubt.

ESI-MS (FTMS-p): In the ESI mass spectrum, the following signal series were identified, which can be attributed to the following empirical formulae:

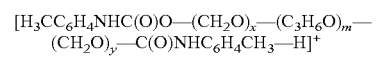

$[H_3CC_6H_4NHC(O)O—(CH_2O)_x—(C_3H_6O)_m—$
$(CH_2O)_y—C(O)NHC_6H_4CH_3—H]^+$

Series 1 (x+y=1): m/z (%) [chain length m]=835.51583 (1.33) [9], 893.55778 (1.92) [10], 951.59968 (2.60) [11], 1009.64154 (3.03) [12], 1067.68336 (2.87) [13], 1125.72543 (2.39) [14], 1183.76712 (1.65) [15], 1241.80915 (1.05) [16].

Series 2 (x+y=2): m/z (%) [chain length m]=749.47901 (3.84) [7], 807.52059 (6.67) [8], 865.56235 (8.82) [9], 923.60424 (10.15) [10], 981.64607 (10.06) [11], 1039.68768 (8.74) [12], 1097.72982 (6.52) [13], 1155.77181 (4.29) [14], 1213.81365 (2.66) [15], 1271.85565 (1.51) [16].

The ESI mass spectrum shows clearly that inventive block copolymers of polypropylene oxide units $(C_3H_6O)_m$ and polyoxymethylene units $(CH_2O)_x$ or $(CH_2O)_y$ with x+y≥1 have been obtained.

In addition, the ESI mass spectrum shows that chains having two 4-tolyl carbamate units have been obtained, and hence the reaction with 4-tolyl isocyanate was successful.

IR spectroscopy: ν=3305 (b, vw, ν[NH]), 2970 (w), 2929 (w), 2899 (w), 2868 (w), 1731 (w, ν[C=O]), 1600 (w), 1536 (b, w), 1453 (b, w), 1406 (w), 1373 (w), 1343 (w), 1315 (w), 1297 (w), 1223 (m), 1209 (w), 1093 (vs), 1004 (m), 933 (m), 853 (w), 818 (m), 768 (vw), 660 (vw), 510 (w) cm$^{-1}$.

The IR spectrum is identical neither to the IR spectrum of paraformaldehyde nor to the IR spectrum of PPG-1000. The occurrence of an additional band at 968 cm$^{-1}$ indicates the presence of oxymethylene groups and hence the incorporation of formaldehyde. The NH— and C=O— stretch vibrations can be attributed to carbamate units. The occurrence of these bands demonstrates that the reaction of the terminal OH groups with tolyl isocyanate was successful. The absence of an NCO band at 2261 cm$^{-1}$ shows that no free 4-tolyl isocyanate is present in the product.

Reference Example 1

Preparation of a Bifunctional Polypropylene Oxide-Polyoxymethylene Block Copolymer Using Paraformaldehyde as Formaldehyde Source and In Situ Modification of the Resultant Product with 4-Tolyl Isocyanate Reference example 1 was conducted analogously to example 1, except that the formaldehyde source used in the polymerization was paraformaldehyde rather than gaseous formaldehyde.

A 300 mL stainless steel reactor with sparging stirrer was initially charged under argon with a mixture of 30.34 g (1.01 mmol) of paraformaldehyde, 20.02 g (20.02 mmol) of PET-1 and 70 mg (0.111 mmol) of dibutyltin dilaurate (DBTL), and the reactor was injected with $CO_2$ to a pressure between 17 and 19 bar. Subsequently, the reactor was heated to an internal temperature of 60° C. On attainment of the temperature, the pressure was adjusted to 20 bar with $CO_2$ and the reaction mixture was stirred at 60° C. for 4.7 h. Thereafter, the reactor was cooled to room temperature and the pressure was released. Subsequently, 5.05 mL (5.33 g, 40.0 mmol) of 4-tolyl isocyanate were metered in at a flow rate of 1 mL/min at internal temperature 40° C. while stirring. After the addition had ended, the reaction mixture was stirred at 60° C. for a further 16 h. After the reactor had been cooled down, 42.20 g of a waxy substance were removed.

Viscosity: 20.28 Pa·s

The viscosity of the product obtained in reference example 1 was an order of magnitude higher than the viscosity of the product obtained in example 1.

IR spectroscopy: ν=3302 (b, vw, ν[NH]), 2972 (w), 2922 (w), 2869 (w), 1730 (b, w, ν[C=O]), 1640 (vw), 1598 (vw), 1537 (b, w), 1406 (b, vw), 1406 (vw), 1374 (w), 1344 (vw), 1316 (vw), 1297 (vw), 1284 (vw), 1236 (w, PFA), 1209 (vw), 1087 (vs), 1038 (w, PFA), 963 (b, m, PFA), 928 (b, s, PFA), 908 (s, shoulder, PFA), 816 (m), 725 (w, PFA), 629 (m, PFA), 509 (w), 453 (w, PFA) cm$^{-1}$.

The comparison of the IR spectrum of the product obtained in reference example 1 with the IR spectrum of paraformaldehyde shows that the product obtained in reference example 1, unlike the product obtained in example 1, still contained paraformaldehyde. This is indicated by the characteristic bands, some of them strong, for paraformaldehyde (PFA) at 1236, 1038, 963, 928, 908, 725, 629 and 453 cm$^{-1}$.

The product obtained, unlike the product obtained in example 1, was not entirely soluble in chloroform. 1.74 g of the resultant product mixture were taken up in chloroform and filtered through a paper filter. The filtration residue isolated after drying was 0.19 g of an insoluble solid. The sample thus contained at least 11% by weight of an insoluble by-product.

For the chloroform-soluble fraction, by gel permeation chromatography (GPC) against polypropylene glycol standards, a number-average molecular weight $M_n$=753 g/mol and a polydispersity index PDI=1.34 were determined. The GPC showed, as well as a higher molecular weight fraction (>633 g/mol, 81.5% by weight) having a number-average molecular weight $M_n$=1098 g/mol and a polydispersity index PDI=1.05, a low molecular weight fraction (<633 g/mol, 18.5% by weight) having a broad molecular weight distribution. This low molecular weight fraction does not arise from the reaction of PET-1 with formaldehyde and was thus an unwanted by-product.

For the $CDCl_3$-soluble fraction, the following NMR data were measured:

$^1$H NMR spectroscopy (400 MHz, $CDCl_3$): δ=1.13 (bs, 24.47H, PET-1-$CH_3$), 1.28 (bs, 1.44H), 2.29 (bs, 3.00H, Tol-$CH_3$), 2.45 (bs, 0.37H), 3.12-3.82 (m, 24.69H, PET-1-CH/PET-1-$CH_2$), 3.82-4.14 (m, 0.70H), 4.69-5.24 (kb, 1.99H, $OCH_2O$/PET-1-C$\underline{H}$($CH_3$)$OCH_2O$ O/PET-1-C$\underline{H}_2$O—$CH_2O$), 5.42 (bs, 1.02H, $CH_2O$), 7.08 (bs, 2.95H, Tol-C$\underline{H}_{ar}$), 7.29 (bs, 1.97H, Tol-$CH_{ar}$), 7.51 (s, 0.07H), 9.71 (s, 0.01H) ppm.

$^{13}$C APT NMR spectroscopy (100 MHz, $CDCl_3$): δ=17.0 (−), 17.3 (−), 17.5 (−), 17.7 (−), 17.8 (−), 18.1 (−), 18.2 (−), 18.5 (−), 20.8 (−, Tol-$CH_3$), 70.6 (−), 71.8 (+), 72.9 (+), 73.4 (+), 73.9 (+), 74.1 (+), 75.0 (−), 75.1 (−), 75.2 (−), 75.4 (−), 75.6 (−), 75.7 (−), 75.8 (+), 75.9 (+), 85.6 (+, $OCH_2O$), 86.1 (+, $OCH_2O$) 88.8 (+, $OCH_2O$), 92.4 (+, $OCH_2O$), 119.0 (−, Tol-$CH_{ar}$), 119.5 (−, Tol-$CH_{ar}$), 122.9 (−, Tol-$CH_{ar}$), 129.5 (−, Tol-C—NH—), 135.7 (+), 152.1-154.1 (+, many signals, Tol-NH—C(O)—O) ppm.

The NMR spectroscopy data of the $CDCl_3$-soluble fraction show that an NCO-modified polyoxymethylene block copolymer was obtained.

The product obtained using paraformaldehyde as formaldehyde source had significantly increased viscosity and lowered solubility compared to the inventive product obtained using gaseous formaldehyde (example 1). The IR spectroscopy data demonstrate that the product obtained in reference example 1 was contaminated with paraformaldehyde. The GPC data show that the product obtained in reference example 1 additionally contained low molecular weight by-products. The use of gaseous formaldehyde thus allows the inventive products to be obtained in higher purity.

Reference Example 2

Preparation of a Bifunctional Polypropylene Oxide-Polyoxymethylene Block Copolymer Using Aqueous Formaldehyde Solution and In Situ Modification of the Resultant Product with 4-Tolyl Isocyanate Reference example 2 was conducted analogously to example 1, except that the formaldehyde source used in the polymerization was aqueous formaldehyde solution rather than gaseous formaldehyde.

A 300 mL stainless steel reactor with sparging stirrer was initially charged under argon with a mixture of 83.09 g of a 35.5% aqueous formaldehyde solution (corresponding to 1.01 mol of formaldehyde), 20.02 g (20.02 mmol) of PET-1 and 70 mg (0.111 mmol) of dibutyltin dilaurate (DBTL), and the reactor was injected with $CO_2$ to a pressure between 17 and 19 bar. Subsequently, the reactor was heated to an internal temperature of 60° C. On attainment of the temperature, the pressure was adjusted to 20 bar with $CO_2$ and the reaction mixture was stirred at 60° C. for 4.7 h. Thereafter, the reactor was cooled to room temperature and the pressure was released. Subsequently, 5.05 mL (5.33 g, 40.0 mmol) of 4-tolyl isocyanate were metered in at a flow rate of 1 mL/min at internal temperature 40° C. while stirring. After the addition had ended, the reaction mixture was stirred at 60° C. for a further 16 h. After the reactor had been cooled down, 88.12 g of a yellow-reddish, inhomogeneous liquid mixture having colorless solid components were removed.

No viscosity was measurable because of the inhomogeneity of the product.

IR spectroscopy: $\nu$=3400 (b, w, $\nu$[OH]), 3308 (b, w, $\nu$[NH]), 2968 (m), 2903 (m), 2872 (m), 2336.9 (vw), 1734 (w, $\nu$[C=O]), 1638 (w), 1616 (w), 1595 (w), 1540 (w), 1515 (m), 1452 (w), 1406 (w), 1373 (m), 1347 (w), 1315 (w), 1295 (w), 1229 (w), 1210 (w), 1087 (vs), 1011 (s), 926 (m), 867 (w). 852 (w), 815 (m), 778 (w), 751 (w), 727 (w), 669 (w), 640 (m), 582 (m), 568 (w), 549 (w), 533 (w), 506 (m), 488 (w), 450 (w), 637 (w), 424 (vw), 409 (vw) $cm^{-1}$.

The IR spectrum of the product obtained in reference example 2 differed fundamentally from the IR spectrum of the product obtained in example 1. The IR spectrum of the product obtained in reference example 2 showed additional signals, for example at 3400, 2337, 1638, 1616, 1373, 867, 751 $cm^{-1}$, and a fundamentally different fingerprint region between 400 and 700 $cm^{-1}$. No assignment of these bands was possible. A strong OH band at 3400 $cm^{-1}$ compared to the product from example 1 indicated that significant amounts of water or free OH groups were present in the product. The IR spectrum thus showed significant contamination with by-products.

Gel permeation chromatography (GPC) of the chloroform-soluble fraction showed an inhomogeneous molecular weight distribution. As well as a higher molecular weight fraction (>602 g/mol, 51% by weight) having a number-average molecular weight $M_n$=1033 g/mol and a polydispersity index PDI=1.05 (calibrated against polypropylene glycol standards), a low molecular weight fraction (<602 g/mol, 49% by weight) having a broad molecular weight distribution was detected. This low molecular weight fraction does not arise from the reaction of PET-1 with formaldehyde and was thus an unwanted by-product.

For the $CDCl_3$-soluble fraction, the following NMR data were measured:

$^1H$ NMR spectroscopy (400 MHz, $CDCl_3$): δ=0.89-0.94 (bs, 0.19H), 0.95-1.16 (m, 29.26H, PET-1-$CH_3$), 1.16-1.25 (m, 0.54H, PET-1-$CH_3$), 2.09-2.29 (kb, 3.00H, Tol-$CH_3$), 2.35 (bs, 0.20H), 2.79 (d, J=8.5 Hz), 2.94 (bs, 2.36H), 3.06-3.16 (m, 0.67H), 3.16-3.77 (kb, 39.80H, PET-1-CH/ PET-1-$CH_2$), 3.77-3.92 (m, 0.83H, PET-1-CH/PET-1-$CH_2$), 3.92-4.03 (m, 0.13H), 4.32-4.38 (m, 0.19H), 4.49 (s, 0.67H), 4.55-4.73 (kb, 7.06H, $OCH_2O$/PET-1-C$\underline{H}$($CH_3$)$OCH_2$O/PET-1-C$\underline{H}_2OCH_2O$), 4.73-5.00 (kb, 11.76H, $CH_2O$), 5.03 (s, 0.39H, $CH_2O$), 5.14-5.15 (m, 0.08H, $CH_2O$), 5.26 (s, 0.39H, $CH_2O$), 5.26-5.40 (m, 0.40H, $CH_2O$), 6.29 (d, J=15.2 Hz, 0.052H), 6.55 (d, J=8.5 Hz, 0.015H), 6.60 (s, 0.016H), 6.63 (s, 0.0064H), 6.66-6.79 (m, 0.22H), 6.79-6.87 (m, 0.24H), 6.87-7.12 (kb, 2.47H), 7.31 (bs, 0.10H), 7.43 (bs, 0.14H), 7.49 (bs, 0.12H), 7.65 (bs, 0.14H), 7.93 (s, 0.0066H) ppm.

The $^1H$ NMR spectrum shows that, as well as polyoxymethylene block copolymers, a multitude of by-products were obtained. In the aromatic region between 6.2 and 8.0 ppm, unlike the product obtained in example 1, a multitude of signals was found. No multiplet in the region of 7.14-7.32 ppm with an integral ratio of about 1.5-2 to 3 in relation to the Tol-$CH_3$ signal at 2.09-2.29 ppm was detected. This shows that the reaction of the polyoxymethylene block copolymer with 4-tolyl isocyanate was incomplete. Instead, a predominant portion of the 4-tolyl isocyanate had reacted unspecifically to give various by-products (for example in the reaction with water with elimination of $CO_2$ to give aniline and conversion products thereof with formaldehyde).

$^{13}C$ APT NMR spectroscopy (100 MHz, $CDCl_3$): δ=16.1 (−), 16.2 (−), 16.7 (−), 16.9 (−), 17.0 (−), 17.1 (−), 17.2 (−), 17.6 (−), 17.8 (−), 17.9 (−), 18.1 (−), 18.3 (−), 18.4 (−), 20.3 (−), 20.4 (−), 20.6 (−), 21.0 (−), 50.1 (−), 54.3 (−), 54.8 (−), 54.9 (−), 55.4 (−), 55.5 (−), 55.6 (−), 55.7 (−), 55.7 (−), 55.8 (−), 56.5 (−), 57.3 (−), 65.7 (−), 67.1 (−), 67.1 (−), 86.1 (+), 69.4 (+), 71.0 (+), 71.0 (−), 72.8 (+), 73.0 (+), 73.2 (+), 73.3 (−), 73.4 (+), 73.5 (−), 73.7 (−), 73.8 (+), 74.2 (−), 74.3 (+), 74.3 (+), 74.4 (+), 74.6 (−), 74.6 (−), 74.7 (−), 74.8 (−), 74.9 (−), 74.9 (−), 75.1 (−), 75.2 (−), 75.2 (−), 75.2 (−), 75.3 (−), 75.4 (−), 75.6 (+), 75.7 (+), 76.0 (+), 76.3 (−), 76.3 (−), 76.4 (−), 76.5 (−), 76.6 (−), 78.6 (+), 79.5 (+), 79.5 (+), 82.1 (+), 82.6 (+), 83.3 (+), 84.2 (+), 84.4 (+), 85.6 (+), 85.6 (+), 86.3 (+), 86.7 (+), 86.8 (+), 86.9 (+), 87.0 (+), 88.1 (+), 88.3 (+), 88.5 (+), 88.7 (+), 88.8 (+), 89.0 (+), 89.2 (+), 89.4 (+), 89.5 (+), 89.7 (+), 89.9 (+), 89.9 (+), 90.1 (+), 90.5 (+), 90.5 (+), 90.8 (+), 91.2 (+), 91.3 (+), 92.1 (+), 92.5 (+), 92.6 (+), 92.7 (+), 93.1 (+), 93.2 (+), 93.3 (+), 93.4 (+), 93.5 (+), 93.6 (+), 94.9 (+), 97.3 (+), 114.6 (−), 114.7 (−), 114.8 (−), 117.0 (−), 117.6 (−), 117.6 (−), 118.9 (−), 119.4 (−), 120.1 (−), 120.4 (−), 120.9 (−), 127.2 (−), 128.0 (−), 128.1 (−), 129.2 (−), 129.3 (−), 129.4 (−), 129.5 (−), 129.5 (−), 129.6 (−), 129.6 (−), 130.8 (−), 130.9 (−), 131.3 (+) ppm.

The $^1H$ NMR and $^{13}C$ APT NMR spectra of the soluble fractions of the product obtained in reference example 2 were not identical to the $^1H$ NMR and $^{13}$-C APT NMR spectra of the product obtained in example 1. The NMR spectra showed that the product obtained in reference example 2 was a complex product mixture which, as well as polyoxymethylene block copolymers, contained a multitude of by-products. A multitude of signals in the aromatic range (6.2 to 8.0 ppm in the $^1H$ NMR spectrum, 114 to 132 ppm in the $^{13}C$ NMR spectrum) shows that the reaction of the polyoxymethylene block copolymer with 4-tolyl isocyanate was incomplete and it had reacted instead in an unspecific manner to give various by-products.

From a portion of 44.03 g of the resultant product mixture, the volatile components were removed at 60° C. under a reduced pressure of 30 mbar. 12.81 g of a waxy residue were obtained, which was not entirely soluble in chloroform. 1.8 g of this residue were taken up in chloroform and filtered through a paper filter. After the volatile components of the filtrate had been removed under reduced pressure, 0.78 g of a waxy substance was obtained. The filtration residue isolated after drying was 0.89 g of an insoluble solid. The sample thus contained at least 49% by weight of an insoluble by-product.

For the filtrate residue, a viscosity of 2.395 Pa·s was determined. The viscosity is distinctly increased compared to the product obtained in example 1.

In reference example 2, unlike example 1, an inhomogeneous product mixture was obtained, which contained firstly a high water content and secondly insoluble solid fractions. The IR spectrum showed the occurrence of by-products. By GPC, for the chloroform-soluble fraction, a high level of low molecular weight by-products was detected. The $^1$H NMR spectrum of the soluble fraction showed that the reaction with 4-tolyl isocyanate to give NCO-modified polyoxymethylene block copolymers was incomplete and a multitude of by-products was obtained. The $^{13}$C APT NMR spectrum also demonstrated a high level of by-products. Comparison with example 1 shows that, on use of aqueous formaldehyde solution, the reaction with the isocyanate proceeds only incompletely and the isocyanate forms unwanted by-products unless the aqueous constituents are removed before this step.

Example 2

Preparation of a Bifunctional Polypropylene Oxide-Polyoxymethylene Block Copolymer and Ex Situ Modification of the Resultant Product with 4-Tolyl Isocyanate Preparation of a bifunctional polypropylene oxide-polyoxymethylene block copolymer:

Reactor 1 was initially charged with a suspension of 30.24 g (1.008 mol) of paraformaldehyde, 0.65 g (1.99 mmol) of 4-dodecylbenzenesulfonic acid and 8.37 g of 3 Å molecular sieve in 30 ml of undecane. Reactor 2 contained a solution of 60.0 mg (0.095 mmol) of dibutyltin dilaurate (DBTL) in 20.01 g (20.01 mmol) of PET-1. Via a bypass line connected to MFC 1, the whole system with the bridge open was pressurized to 20 bar with $CO_2$. Then the bridge was closed and the pressure in reactor 1 was reduced to 5 bar by means of a gas outlet valve. The reaction mixture in reactor 1 was heated to 125° C. while stirring with the bridge shut off, and the reaction mixture in reactor 2 to 60° C. while stirring. The bridge temperature was adjusted to 170° C. On attainment of the reaction temperature, the pressure in reactor 2 was adjusted to a value between 17 and 19 bar. The pressure in reactor 1 was adjusted to 20 bar with $CO_2$ via the bypass. The bypass line was closed and a constant argon flow rate $\hat{V}_{out}=\hat{V}_{in}$, 47.6 ml/min was established using the mass flow regulators. Directly thereafter, the bridge was opened. After 4.2 h, the bridge was closed, the system was cooled to room temperature and the pressure was released separately in reactor 1 and reactor 2.

Weighing of reactor 2 showed an increase in weight of 1.58 g for the reaction, corresponding to a formaldehyde transfer of 52.6 mmol. Thus, the PET-1 used as monomer was extended by an average of 2.63 formaldehyde units per molecule.

Viscosity: 0.1405 Pa·s

By gel permeation chromatography (GPC) against polystyrene standard, a number-average molecular weight $M_n$=1015 g/mol and a polydispersity index PDI=1.08 were determined. The small increase in the measured number-average molecular weight compared to the measured number-average molecular weight of the PET-1 used as starter is attributable to different interaction of the polymer chains with the column material.

$^1$H NMR spectroscopy (400 MHz, CDCl$_3$): δ=0.56-1.02 (m, 51.72H, CH$_3$), 2.79-3.60 (kb, 51.79H, PET-1-CH/PET-1-CH$_2$), 4.38 (bs, 0.104H, O—CH$_2$—O), 4.88 (bs, 0.106H, O—CH$_2$—O), 4.73-4.75 (m, 0.986H, O—CH$_2$O) ppm.

$^{13}$C APT NMR spectroscopy (100 MHz, CDCl$_3$): δ=13.4 (−), 16.4 (−), 16.4 (−), 16.5 (−), 16.5 (−), 16.6 (−), 16.6 (−), 16.7 (−), 17.3 (−), 17.4 (−), 17.5 (−), 17.6 (−), 17.8 (−), 17.9 (−), 18.1 (−), 18.2 (−), 18.3 (−), 18.3 (−), 21.9 (+), 28.6 (+), 28.9 (+), 29.0 (+), 31.1 (+), 72.3 (+), 72.6 (+), 72.9 (+), 73.1 (+), 73.9 (+), 74.0 (+), 74.1 (−), 74.1 (−), 74.2 (−), 74.2 (−), 74.3 (−), 74.4 (−), 74.5 (−), 74.7 (−), 74.7 (−), 75.0 (+, 0-CH$_2$—O). 88.3 (+. O—CH$_2$—O), 88.8 (+, O—CH$_2$—O), 89.6 (+, O—CH$_2$—O), 92.7 (+, O—CH$_2$—O) ppm.

The signals in the $^1$H NMR spectrum between 4.38 and 4.75 ppm, and between 75.0 and 92.7 ppm in the $^{13}$C APT NMR spectrum (methylene groups having positive polarity), indicate the presence of oxymethylene units as well as polypropylene oxide units in the product. The presence of several oxymethylene signals with different chemical shifts indicates the different chain lengths n of the polyoxymethylene units (CH$_2$O), and hence demonstrates that inventive polypropylene oxide-polyoxymethylene block copolymers having ≥1 oxymethylene group per polyoxymethylene unit were obtained.

IR: v=3455 (b, vw, v[OH]), 2970 (w), 2930 (w), 2868 (w), 1453 (w), 1373 (w), 1344 (w), 1297 (w), 1260 (vw), 1091 (vs), 1013 (w), 968 (w), 928 (w), 864 (w), 838 (w), 665 (vw), 581 (vw), 523 (vw), 469 (vw), 436 (vw), 427 (vw), 410 (vw) cm$^{-1}$.

The occurrence of a new band at 968 cm$^{-1}$ indicates the presence of oxymethylene groups.

Ex situ modification of the polypropylene oxide-polyoxymethylene block copolymer with 4-tolyl isocyanate:

A round-bottom flask was initially charged with 5.0 g of the resultant polypropylene oxide-polyoxymethylene block copolymer, and 1.16 mL (1.22 g, 9.16 mmol) of 4-tolyl isocyanate were added. The reaction mixture was stirred for a further 2 h. 6.20 g of a viscous, colorless oil were obtained.

Viscosity: 2.543 Pa's

By gel permeation chromatography (GPC) against polystyrene standard, a number-average molecular weight $M_n$=1138 g/mol and a polydispersity index PDI=1.05 were determined.

$^1$H NMR (400 MHz, CDCl$_3$): δ=0.75-0.82 (m, 0.41H), 0.91-1.13 (m, 27.78H, PET-1-CH$_3$), 1.13-1.29 (m, 3.93H, PET-1-CH$_3$), 2.18 (s, 3.00H, Tol-CH$_3$), 3.12-3.72 (kb, 29.39H, PET-1-CH/PET-1-CH$_2$), 3.72-3.92 (m, 0.38H, PET-1-CH/PET-1-CH$_2$), 4.86-5.00 (m, 0.75H, OCH$_2$O/PET-1-CH(CH$_3$)OCH$_2$O/PET-1-CH$_2$OCH$_2$O), 5.04 (s, 0.58H, O—CH$_2$—O), 5.25-5.38 (m, 0.11H, O—CH$_2$—O), 6.97 (d, J=7.9 Hz, 2.00H, Tol-CH$_{ar}$), 7.16-7.29 (m, 2.10H, Tol-CH$_{ar}$) ppm.

$^{13}$C APT NMR (400 MHz, CDCl$_3$): δ=14.0 (−), 16.9 (−), 17.0 (−), 17.2 (−), 17.2 (−), 17.3 (−), 17.9 (−), 17.9 (−), 18.0 (−), 18.1 (−), 18.4 (−), 20.6 (−, Tol-CH$_3$), 22.5 (+), 29.2 (+), 29.5 (+), 29.5 (+), 31.7 (+), 65.4 (−), 67.0 (−), 67.1 (−), 70.2 (−), 70.3 (−), 71.6 (+), 71.7 (+), 71.8 (+), 72.7 (+), 72.8 (+), 72.9 (+), 73.0 (+), 73.2 (+), 73.4 (+), 73.7 (+), 74.3 (+), 74.4 (+), 74.8 (−), 74.9 (−), 75.0 (−), 75.0 (−), 75.2 (−), 75.2 (−), 75.4 (−), 75.5 (−), 88.5 (+, O—CH$_2$—O), 93.4 (+, O—CH$_2$—O), 118.6 (−, Tol-CH$_{ar}$), 118.8 (−, Tol-CH$_{ar}$), 129.2 (−, Tol-CH$_{ar}$), 131.4 (+), 132.3 (+, Tol-CNH), 135.7 (+, Tol-CCH$_3$), 136.8 (+), 153.2 (+, O—C(O)—NH-Tol) ppm.

The signals between 4.85 and 5.38 ppm in the $^1$H NMR spectrum, and at 88.5 and 93.4 in the $^{13}$C APT NMR spectrum show that the product contains polyoxymethylene units.

Both the $^1$H NMR and the $^{13}$C APT NMR spectra show that the reaction of the polypropylene oxide-polyoxymethylene copolymer obtained and isolated beforehand with 4-tolyl isocyanate to give polyurethane-analogous compounds was successful. The comparison of the integrals for the methyl groups Tol-CH$_3$ and PPG-CH$_3$ gives a ratio of 0.095 Tol-CH$_3$ to 1 PPG-CH$_3$. For an average chain length of 17.02 (CH(CH$_3$)CH$_2$O)— units per molecule, this gives an average of 1.610 4-tolyl carbamate units per molecule. The reaction of the polyoxymethylene block copolymer with 4-tolyl isocyanate accordingly proceeded with a conversion of 80%/o.

IR: v=3301 (b, vw, v[NH]), 2971 (w), 2929 (w), 2868 (w), 1728 (w, v[C=O]), 1599 (w), 1534 (w), 1453 (w), 1407 (w), 1373 (w), 1344 (w), 1315 (w), 1297 (w), 1224 (m), 1209 (w), 1091 (vs), 1017 (m), 968 (vw), 929 (w), 855 (vw), 818 (m), 768 (vw), 711 (vw), 666 (vw), 580 (vw), 543 (vw), 510 (w), 465 (vw) cm$^{-1}$.

The IR spectrum is not identical to the IR spectrum of paraformaldehyde, to the IR spectrum of PET-1 or to the IR spectrum of the starting material. The occurrence of a new band at 968 cm$^{-1}$ indicates the presence of oxymethylene groups. The NH— and C=O— stretch vibrations can be attributed to carbamate units. The occurrence of these bands demonstrates that the reaction of the terminal OH groups with tolyl isocyanate was successful. The absence of an NCO band at 2261 cm$^{-1}$ shows that no free 4-tolyl isocyanate was present in the product.

Example 3

Preparation of a Trifunctional Polypropylene Oxide-Polyoxymethylene Block Copolymer and In Situ Modification of the Resultant Product with 4-Tolyl Isocyanate Reactor 1 was initially charged with a suspension of 30.18 g (1.006 mol) of paraformaldehyde, 0.66 g (2.02 mmol) of 4-dodecylbenzenesulfonic acid and 8.43 g of 3 Å molecular sieve in 30 ml of undecane. Reactor 2 contained a solution of 110.0 mg (0.174 mmol) of dibutyltin dilaurate (DBTL) in 20.01 g (28.6 mmol) of PET-2. Via a bypass line connected to MFC 1, the whole system with the bridge open was pressurized to 20 bar with argon. Then the bridge was closed and the pressure in reactor 1 was reduced to 5 bar by means of a gas outlet valve. The reaction mixture in reactor 1 was heated to 125° C. while stirring with the bridge shut off, and the reaction mixture in reactor 2 to 60° C. while stirring. The bridge temperature was adjusted to 170° C. On attainment of the reaction temperature, the pressure in reactor 2 was adjusted to a value between 17 and 19 bar. The pressure in reactor 1 was adjusted to 20 bar with $CO_2$ via the bypass. The bypass line was closed and a constant argon flow rate $\hat{V}_{out}=\hat{V}_{in}=72$ m/min was established using the mass flow regulators. Directly thereafter, the bridge was opened. After 4.8 h, the bridge was closed, the system was cooled to room temperature and the pressure was released separately in reactor 1 and reactor 2. Subsequently, 10.7 mL (11.30 g, 84.9 mmol) of 4-tolyl isocyanate were introduced into reactor 2 at a flow rate of 1 mL/min while stirring at an internal temperature of 40° C. After the addition had ended, the reaction mixture in reactor 2 was stirred at 60° C. for a further 16 h. Weighing of reactor 2 before the removal of the product showed an increase in weight of 3.51 g (difference in mass minus the mass of the isocyanate fed in) for the reaction, which corresponds to a transfer of 3.51 g (116.9 mmol) of gaseous formaldehyde. 28.79 g of a viscous, colorless oil were removed from reactor 2.

As a result of transfer of 3.51 g (116.9 mmol) of formaldehyde, the PET-2 used as oligomer was extended by an average of 4.09 formaldehyde units per molecule, or 1.36 formaldehyde units per chain end.

Viscosity: 14.65 Pa's

By gel permeation chromatography (GPC) against polystyrene standard, a number-average molecular weight $M_n$=816 g/mol and a polydispersity index PDI=1.07 were determined.

$^1$H-NMR (400 MHz, CDCl$_3$): δ=0.73-0.81 (m, 0.51H), 0.91-1.11 (m, 10.48H, PET-2-CH$_3$), 1.11-1.26 (m, 3.93H, PET-2-CH$_3$), 2.09-2.30 (m, 3.00H, Tol-CH$_3$), 3.12-3.71 (kb, 13.80H, PET-2-CH/PET-2-CH$_2$), 3.71-3.82 (bs, 0.40H, PET-2-CH/PET-2-CH$_2$), 4.65 (s, 0.04H, O—CH$_2$—O), 4.79 (s, 0.01H, O—CH$_2$—O), 4.83 (s, 0.01H. O—CH$_2$—O), 4.84-4.98 (bs, 0.78H, OCH$_2$O/PET-2-C$\underline{H}$(CH$_3$)OCH$_2$O O/PET-2-C$\underline{H}_2$OCH$_2$O), 5.05 (s, 0.83H, O—CH$_2$—O), 5.24-5.35 (m, 0.17H, O—CH$_2$—O), 6.92-7.04 (m, 2.16H, Tol-CH$_{ar}$), 7.08-7.29 (m, 2.10H, Tol-CH$_{ar}$) ppm.

$^{13}$C APT NMR (400 MHz, CDCl$_3$): δ =14.1 (−), 17.0 (−), 17.3 (−), 18.2 (−), 18.2 (−), 18.5 (−), 20.8 (−, Tol-CH$_3$), 22.7 (+), 29.4 (+), 29.7 (+), 29.7 (+), 31.9 (+), 65.6 (−), 67.1 (−), 67.2 (−), 67.3 (−), 69.5 (+), 69.8 (+), 70.5 (−), 70.7 (−), 70.7 (−), 71.5 (+), 71.8 (+), 72.9 (+), 73.0 (+), 73.1 (+), 73.4 (+), 74.3 (+), 74.4 (+), 74.5 (+), 75.0 (−), 75.2 (−), 75.6 (−), 75.7 (−), 75.9 (−), 76.0 (−), 93.6 (+, O—CH$_2$—O), 118.0 (−, Tol-CH$_{ar}$), 118.7 (−, Tol-CH$_{ar}$), 119.6 (−, Tol-CH$_{ar}$), 129.4 (−, Tol-CH$_{ar}$), 129.7 (−, Tol-CH$_{ar}$), 132.6 (+, Tol-C—NH), 135.7 (+, Tol-$\underline{C}$CH$_3$), 153-154 (+, Tol-NH—C(O)—O) ppm.

The signals for oxymethylene groups O—CH$_2$—O in the $^1$H and $^{13}$C APT NMR spectrum show that a block copolymer consisting of polypropylene oxide and polyoxymethylene units is present.

Both the $^1$H NMR and the $^{13}$C APT NMR spectra show that the reaction of the polypropylene oxide-polyoxymethylene copolymer with 4-tolyl isocyanate to give polyurethane-analogous compounds was successful. The comparison of the integrals for the methyl groups Tol-CH$_3$ and PPG-CH$_3$ gives a ratio of 0.208 Tol-CH$_3$ to 1 PPG-CH$_3$. For an average content of 11.26 (CH(CH$_3$)CH$_2$O)— units per molecule, this gives an average of 2.342 4-tolyl carbamate units per molecule. The reaction of the polyoxymethylene block copolymer with 4-tolyl isocyanate accordingly proceeded with a conversion of 78%.

IR: v=3303 (b, w, v[NH]), 2971 (w), 2928 (w), 2869 (w), 1727 (m, v[C=O]), 1638 (w), 1596 (m), 1530 (m), 1453 (w), 1407 (w), 1374 (w), 1345 (w), 1315 (m), 1296 (w), 1224 (m), 1209 (m), 1160 (m), 1080 (vs), 1018 (m), 967 (w), 930 (w), 816 (m), 768 (w), 751 (vw), 708 (vw), 640 (vw), 570 (vw), 523 (vw), 507 (m), 466 (w), 451 (vw) cm$^{-1}$.

The IR spectrum is not identical to the IR spectrum of paraformaldehyde or to the IR spectrum of PET-2. The occurrence of a new band at 967 cm$^{-1}$ indicates the presence of oxymethylene groups. The NH— and C=O— stretch vibrations can be attributed to carbamate units. The occurrence of these bands shows that the reaction of the terminal OH groups with 4-tolyl isocyanate was successful. The absence of an NCO band at 2261 cm$^{-1}$ shows that no free 4-tolyl isocyanate is present in the product.

The invention claimed is:

1. A process for preparing NCO-modified polyoxymethylene block copolymers, comprising the step of polymerizing gaseous formaldehyde in the presence of a catalyst selected from the group consisting of basic catalysts, Lewis-acidic catalysts, and combinations thereof, to form a polyoxymethylene block copolymer intermediate, wherein
   the polymerization of formaldehyde is effected in the presence of a starter compound having at least two Zerewitinoff-active hydrogen atoms, giving an intermediate having a number-average molecular weight of <4500 g/mol, and
   reacting the intermediate with an isocyanate in the presence of a catalyst which is the same catalyst as in the preceding polymerization of formaldehyde, to give an NCO-modified polyoxymethylene block copolymer.

2. The process as claimed in claim 1, wherein the starter compound has a number-average molecular weight of ≥100 g/mol to ≤3000 g/mol.

3. The process as claimed in claim 1, wherein the starter compound is an oligomeric compound.

4. The process as claimed in claim 1, wherein the starter compound is selected from the group consisting of polyether polyols, polyester polyols, polyether ester polyols, polycarbonate polyols, polyacrylate polyols, and combinations thereof.

5. The process as claimed in claim 1, wherein the isocyanate is an aliphatic or aromatic di- or polyisocyanate.

6. The process as claimed in claim 1, wherein the polymerization is additionally effected in the presence of a comonomer.

* * * * *